United States Patent [19]
Danekas et al.

[11] Patent Number: 5,980,173
[45] Date of Patent: Nov. 9, 1999

[54] DEVICE FOR SECURING A LOAD

[75] Inventors: Rolf Danekas, Waldfeucht; Hans-Werner Kämper, Wuerselen, both of Germany

[73] Assignee: Spanset Inter Ag, Oetwil am See, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/671,355

[22] Filed: Jun. 27, 1996

[30] Foreign Application Priority Data

Jul. 3, 1995 [DE] Germany .................... 295 11 241

[51] Int. Cl.⁶ .................................................. B60P 7/08
[52] U.S. Cl. .......................... 410/99; 410/41; 410/97
[58] Field of Search ................... 410/41, 85, 97, 410/99, 155; 24/16 R, 115 K, 129 B; 248/345.1; 206/453, 586

[56] References Cited

U.S. PATENT DOCUMENTS

| | | | |
|---|---|---|---|
| 968,455 | 8/1910 | Eastabrook | 410/41 |
| 1,003,108 | 9/1911 | Hinrichs | 410/41 |
| 1,897,138 | 2/1933 | North | 410/99 |
| 3,154,026 | 10/1964 | Klasing, Jr. | 410/41 |
| 3,199,709 | 8/1965 | Morrison . | |
| 3,378,889 | 4/1968 | Dunderdale . | |
| 3,637,234 | 1/1972 | Thomas et al. . | |
| 4,525,113 | 6/1985 | Colman | 410/41 |
| 4,526,500 | 7/1985 | Patrick | 410/48 |
| 4,770,578 | 9/1988 | Coleman | 410/99 X |
| 5,226,764 | 7/1993 | Meriwether | 410/99 |
| 5,518,348 | 5/1996 | Tucker | 410/99 |
| 5,538,376 | 7/1996 | Borda | 410/99 |
| 5,584,623 | 12/1996 | Nadherny | 410/99 |

FOREIGN PATENT DOCUMENTS

| | | | |
|---|---|---|---|
| 1328941 | 4/1963 | France | 410/99 |
| 1405359 | 12/1965 | France | 410/99 |
| 7916385 | 10/1979 | Germany . | |
| 992264 | 2/1983 | U.S.S.R. | 410/12 |

*Primary Examiner*—Stephen T. Gordon
*Attorney, Agent, or Firm*—Venable; George H. Spencer; Catherine M. Voorhees

[57] ABSTRACT

Load securing device with at least one prestressable lashing device, wherein the loading good has a guide that is effective as a belt bearing surface and wherein the lashing device that rests against the belt bearing surface while it is lashed down secures the loading good by using a combination of retaining and diagonal lashing.

2 Claims, 5 Drawing Sheets

DEVICE FOR SECURING A LOAD

BACKGROUND OF THE INVENTION

The invention at hand relates to a device for securing a load with at least one lashing means that can be prestressed. The device in particular serves to secure heavy and solid loading goods, for example building panels, sheet-metal bundles or sheet-metal coils. Such heavy and solid loading goods have a high dead weight. Owing to the high dead weight, only a relatively low volume of these loading goods can be transported on the loading surface of a transport vehicle, e.g. a truck or railway freight car. As a result of the low volume, these loading goods have a low height on the loading surface.

It is known to secure loading goods against slippage on the loading surface with the aid of the so-called "lashing-down" technique. During the lashing-down, the load is secured by applying a vertical force to the load that essentially runs perpendicular to the loading surface. The lashing belt here is stretched from one end of the loading surface to the other end and thus spans the loading surface. The loading good is inserted in a vertical direction between the loading surface and the lashing belt. The lashing belt can be prestressed with the aid of a tensioning means, e.g. a tensioning ratchet or a tensioning winch. As a result of the prestressing, one flat side of the lashing belt pushes against the loading good and in this way projects a vertical lashing down force onto the loading good.

When lashing down the above-mentioned heavy, solid loading goods that are stacked low, the distance between the loading surface and the belt surface that fits flat against the surface of the good is very small. The lashing belt in the tensioned condition thus approaches the loading surface in an asymptotic way, which causes the lashing-down force that is effective in the vertical direction to drop disproportionally. In that case, the lashing-down force effective in the vertical direction is no longer sufficient to secure the load, that is, it won't absorb the acceleration or deceleration forces that essentially act upon the loading goods in the horizontal direction.

An operationally reliable securing of heavy loading goods, which are also stacked low, by lashing them down could thus only be achieved by using a plurality of lashing belts to hold down the loading good. The number of lashing belts is limited, however, because of the limited volume. In addition, applying several lashing belts is very time-consuming, so that as a rule no hauler is willing to accept this additional expenditure in time. As another solution to this problem, it would be conceivable to mount load-securing elements on the loading surface, e.g. wedges and planks. Such form-fitting load-securing elements would be suitable for absorbing a portion of the forces that are generated in the horizontal direction and occur during the acceleration and deceleration. However, corresponding mounting aids would have to be provided for on the loading surfaces, which would make the securing of the load considerably more expensive. In addition, the time expenditure required for installing this load securing device as compared to a standard lashing-down would be so high that, again, there is no inclination on the part of the haulers to invest in this higher expenditure in time and installation.

All previously mentioned problems are made worse in that the aforementioned loading goods as a rule do not have fixed lashing points, such as arresting parts, which generally makes it more difficult to attach a lashing means.

SUMMARY OF THE INVENTION

Starting with the disadvantages described above, it is the object of the invention to provide a load securing device in such a way that a heavy, solid loading good with low volume can be lashed down on a loading surface with the aid of a lashing means while meeting all requirements for securing a load on transport vehicles.

This problem is solved by providing a guide positioned on the loading good and having a bearing surface, and at least one prestressable lashing device that rests against and is guided by the bearing surface. The lashing device is arranged at a diagonal relative to the loading surface when pulled tight to secure and retain the loading good. The principal idea for this solution consists in attaching a combination retaining and diagonal lashing to the loading good. This combination retaining and diagonal lashing essentially holds the loading good with force components that run essentially diagonal to the loading surface and which are sufficient to compensate for the acceleration and deceleration forces that essentially act upon the loading good and thus ensure a solid securing of the loading goods on the loading surface. In order to prevent a buckling of the lashing means and achieve a uniformly good fastening of the lashing means to the loading good, a belt bearing surface is provided on the loading good that serves as a guide for the lashing means.

This guide can either be rigidly connected to the loading good or can be designed as a separate adaption part. Particularly suited for this is a combination deflection and support element. This combination deflection and support element has a belt bearing surface that is adapted to the respective lashing means and a loading good bearing surface that is adapted to the geometry of the loading good. If the term "lashing means" is used in connection with the invention, this can be any conceivable form of a lashing means, for example ropes, cables, chains, bands and belts made of all imaginable materials such as steel, plastic, textile or hemp. Particularly suitable as lashing means is a lashing belt and a guide with a concave arrangement on the loading good or as belt bearing surface on the combined deflection and support element. In the range of the guiding surface for the belt band, the lashing belt rests with its total flat belt side on this concave belt bearing surface, so that a particularly good support of the lashing belt on the belt bearing surface is ensured. In addition, an undesirable buckling of the lashing belt is effectively prevented. Rather, the lashing belt is placed in a predefined and desired radius around the belt bearing surface and thus around the loading good, which ensures and realizes a deflection of the lashing belt in a way that is especially protective of the material. Its is also possible to have different diagonal positions for the tensioning means on the vehicle. In this way, it is possible to use different lashing points on the vehicle in a like manner for the most varied positions of the loading good on the loading surface. This ensures a high degree of flexibility and a plurality of possibilities for use, in particular of the deflection and supporting element that is separate from the loading good.

The attachment of the lashing means below the top of the loading good, ensures a high share of force components of the lashing force that are effective in the horizontal direction and which are particularly suitable for neutralizing the acceleration and deceleration forces that also run essentially in the horizontal direction. The attachment of the lashing means, which in part projects over the top surface of the loading good, on the one hand has the advantage of effectively preventing a tilting-up of the secured loading good and, on the other hand, ensures a particularly good statistical distribution of the force components over the guide or the combined deflection and supporting element. Further a lashing means that is arranged exclusively on the top surface of the loading good is conceived for those cases where it is most important to secure the loading good against tilting up.

With respect to production techniques, advantageous combinations of materials and production methods for the deflection and support element are proposed, which favor a series production of the deflection and support element as a preassembled part.

A further production option for the deflection and support element is proposed, which is particularly suited for the manual production of individual deflection and support elements that can also be adapted to special arrangements.

The use of a special angle made of plastic or metal as deflection and support element is likewise proposed. A separate element protection is proposed for a deflection and support element, because we are here dealing with a separate combination of inventive features:

BRIEF DESCRIPTION OF THE DRAWINGS

With the aid of the exemplary embodiments represented in the drawings, the invention is explained with further essential features. Shown are.

DETAILED DESCRIPTION OF THE INVENTION

Figure 1:
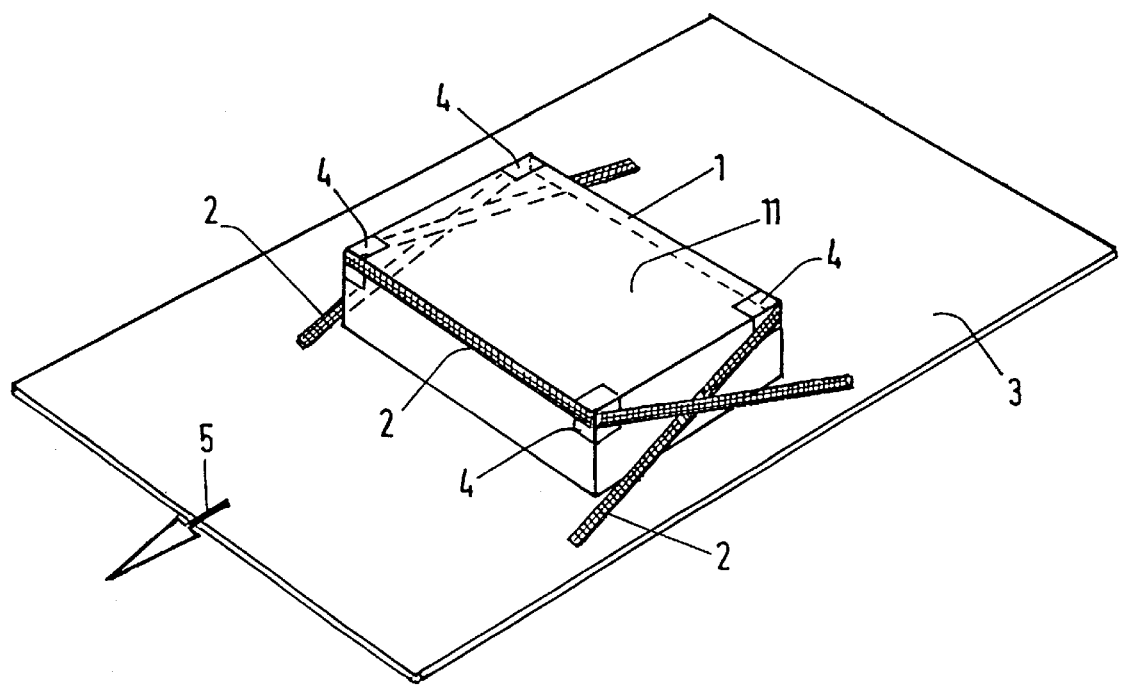
FIG. 1 The combined retaining and diagonal lashing according to the invention.

The rectangular-shaped loading good 1 shown in FIG. 1 is lashed to the loading surface 3 with two lashing belts 2 that are indicated diagrammatically in FIG. 1. A combination deflection and support element 4 that serves as guide for the respectively coordinated lashing belt 2 is attached to each of the four corners of the loading good 1. The combination retaining and diagonal lashing shown in FIG. 1 prevents a sliding of the loading good 1 on the loading surface 3 in or counter to the driving direction 5.

Figure 2:
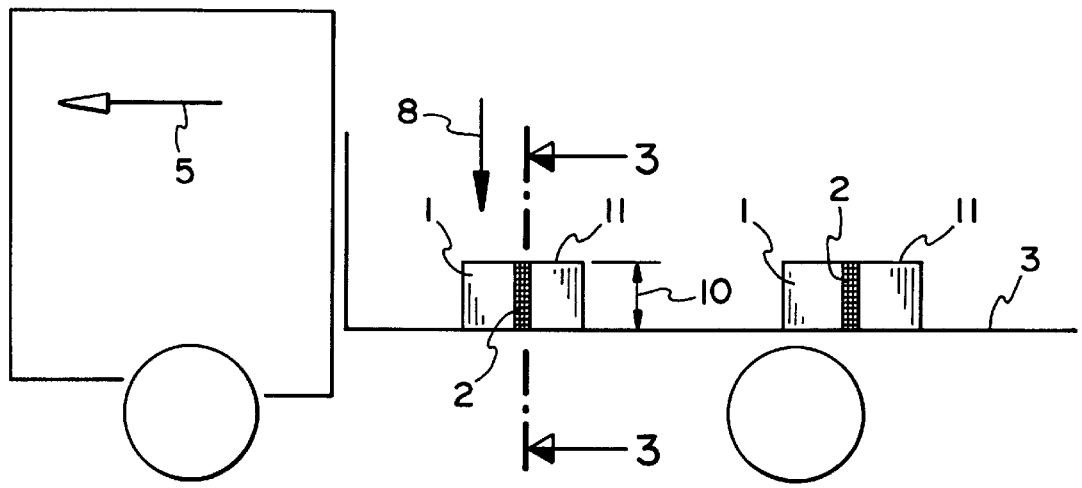
FIG. 2 The illustration of a truck with a load securing device based on Prior Art.
Figure 3:
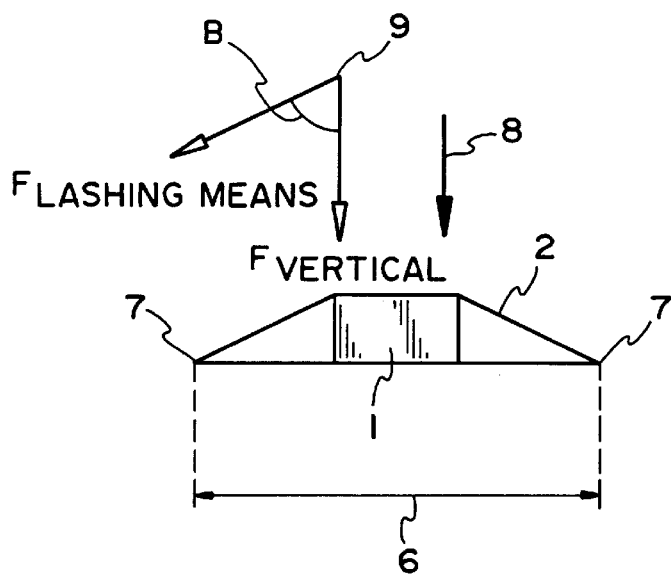
FIG. 3 The sectional view taken along III—III according to FIG. 2.
Figure 4:
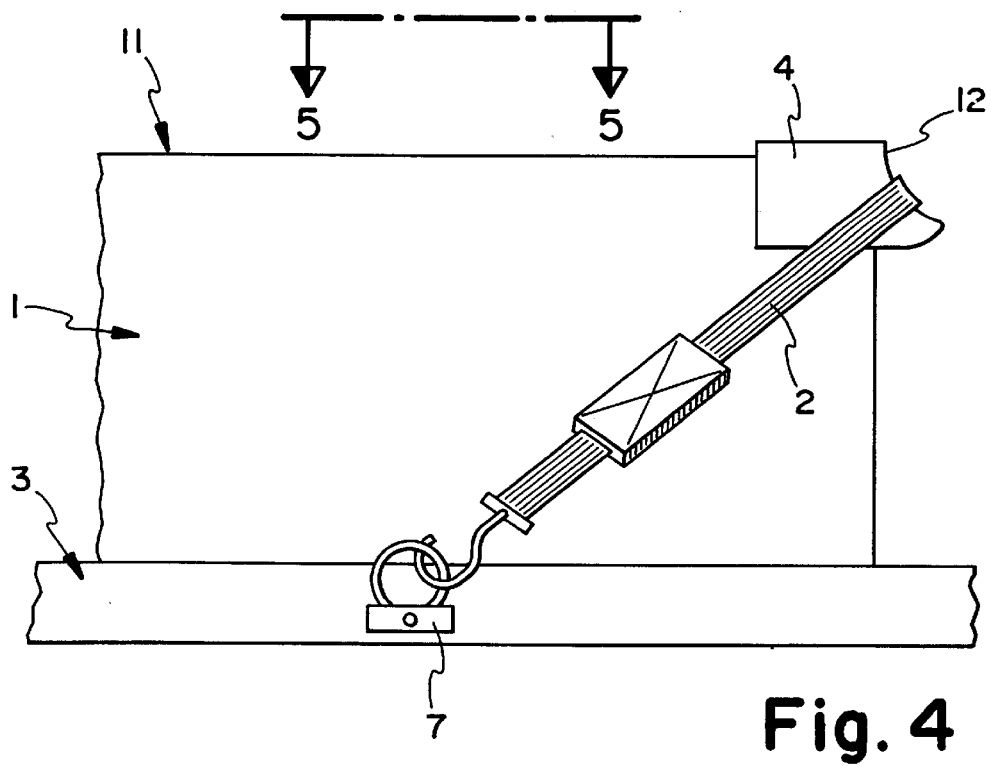
FIG. 4 A perspective partial view of the loading good secured on the loading surface with the aid of the load securing device according to the invention.

When securing the load using only the known lashing-down technique (FIG. 2, FIG. 3), the lashing belt 2 is attached to the loading surface 3 in such a way that it spans the loading surface 3 with respect to the loading surface width 6. The lashing belt 2 is prestressed by means of prestressing devices provided for at the lashing points 7, but which are not shown in the drawings, in such a way that its effective length that spans the loading surface width 6 is shortened, so that a force component $F_{vertical}$ that is effective as a lashing-down force acts upon the belt in the vertical direction 8 of the loading good 1. The triangle of forces 9 in FIG. 3 shows the force $F_{lashing\ means}$ that is generated directly through prestressing of the lashing belt, as well as the force component $F_{vertical}$ that is effective in vertical direction 8. The force component $F_{vertical}$ corresponds to the lashing-down component effective during the lashing-down. The two force components $F_{lashing\ means}$ and $F_{vertical}$ between them form the angle X, wherein the vertical force component $F_{vertical}$ is proportional to the angle β. In other words, this means that the vertical force component $F_{vertical}$ decreases with a decreasing vertical distance 10 between the loading surface 3 and the upper surface 11 of loading good 1. This decrease in the vertical force components $F_{vertical}$ with decreasing loading good height (=vertical distance 10) is also the reason why a lashing-down of low-height loading goods 1 with high dead weight does not work.

Figure 5:
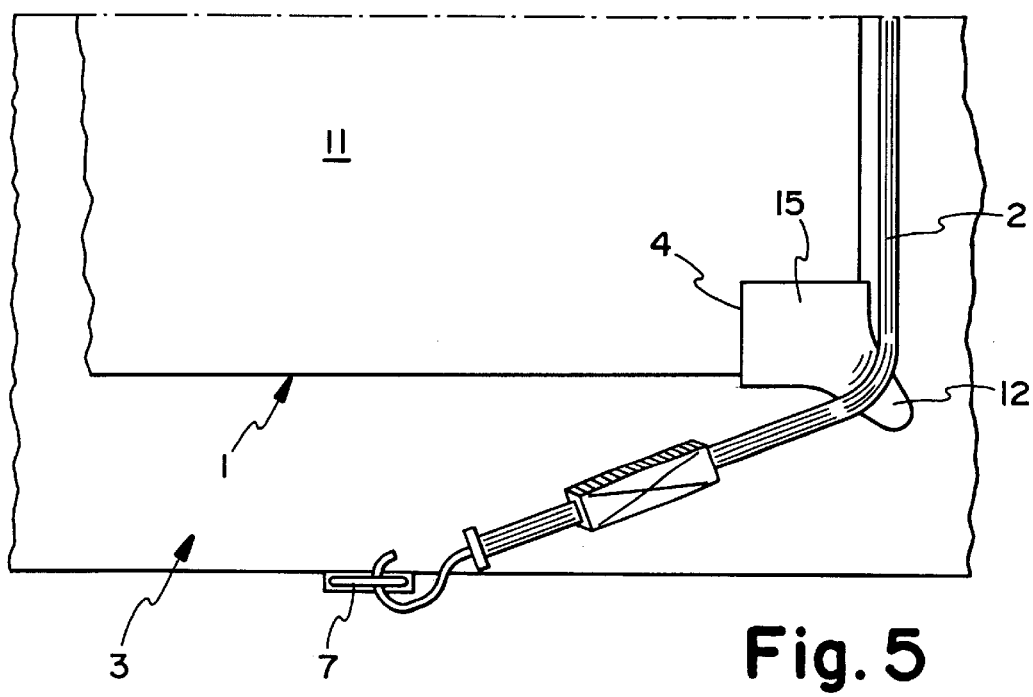
FIG. 5 The view from above of the loading good secured on the loading surface according to arrow V in FIG. 4.
Figure 6:
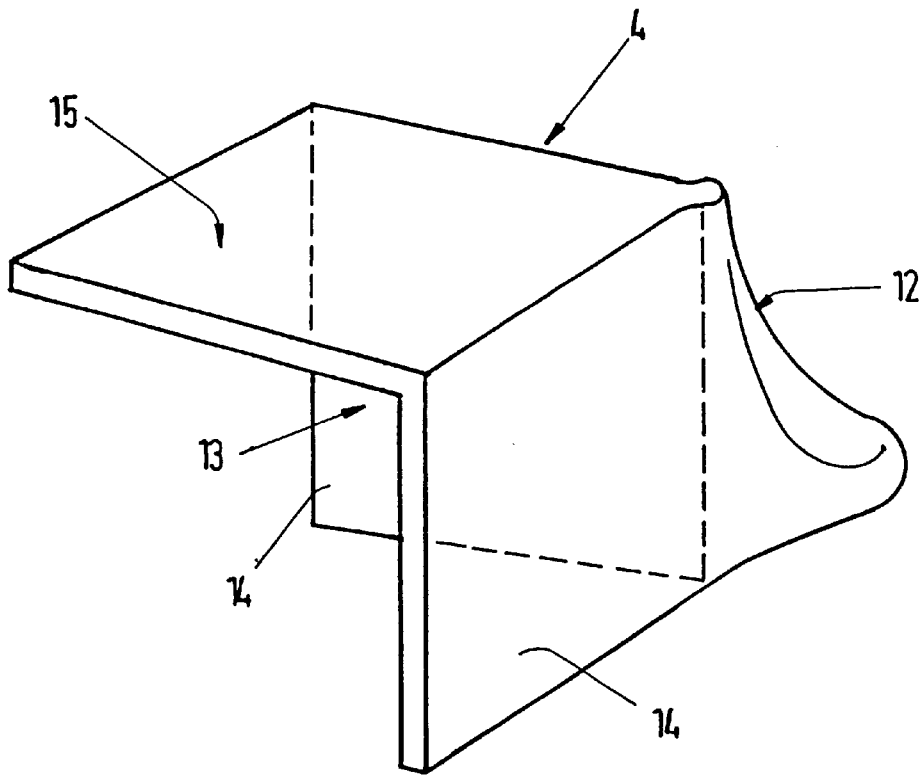
FIG. 6 A perspective illustration of a combined deflection and support element.

The deflection and support element 4 for the retaining and diagonal lashing according to FIG. 1 has a concave belt bearing surface 12 on the side that is facing away from the loading good 1. The geometry of the loading good bearing surface 13 (FIGS. 6 and 7) which is facing the loading good is adjusted to the coordinated edge of the loading good 1. The FIGS. 4 to 9 show all the different embodiments for deflection and support elements 4 for rectangular loading goods 1. These deflection and support elements 4 are respectively pushed onto the four edges or corners of the loading good upper surface 11. The deflection and support element 4 here consists of two angular sides 14 that form an angle, and a covering surface or plate 15 that overstretches the angular sides 14 on one side. The illustration in FIG. 5 shows particularly well how the lashing belt 2 conforms to the bearing surface 12. The lashing belt 2 is deflected without buckling at the belt bearing surface 12 and is guided form-fitting by the concavity of the belt bearing surface 12.

Figure 7:
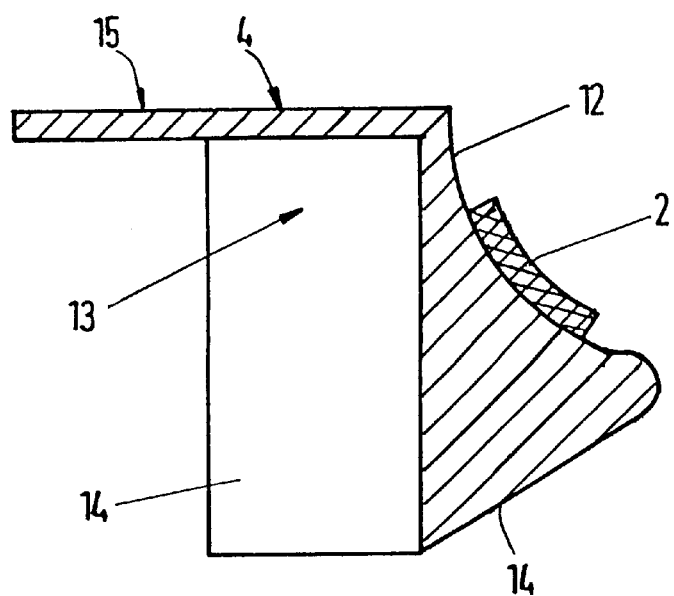
FIG. 7 The sectional view from the side of a combined deflection and support element with a lashing belt that fits flush against the belt bearing surface.
Figure 9:
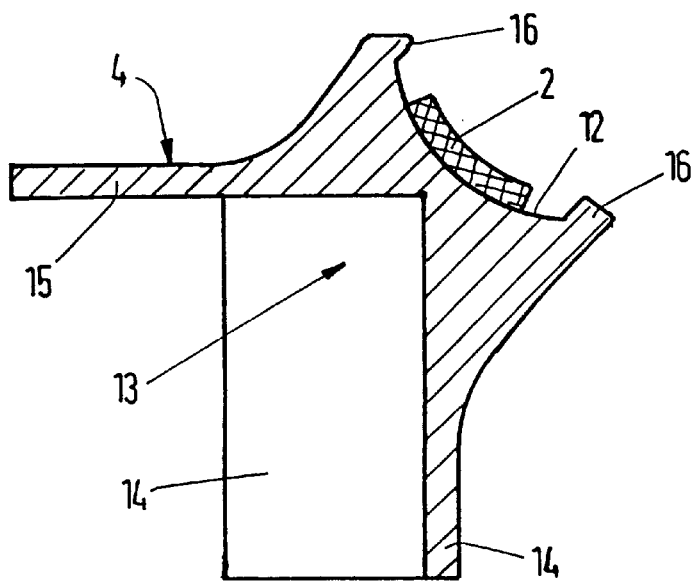

FIGS. 7 and 9 show embodiments of the deflection and support element 4, which are designed as molded parts, wherein the lashing belt 2 in the embodiment according to FIG. 7 runs below the covering surface or plate 15 and thus also below the loading good upper surface 11, while the lashing belt 2 in FIG. 9 runs partially above and partially below the covering surface or plate 15 and thus also the loading good upper surface 11. For the embodiment according to FIG. 9, two fixing projections 16 are formed along the edges of belt bearing surface 12, which project from the belt bearing surface 12, and are designed for the additional form-fitting securing of the lashing belt 2 to the belt bearing surface 12. The embodiment according to FIG. 9 could therefore also be called a belt bearing trough that is effective as belt guide.

Figure 8:
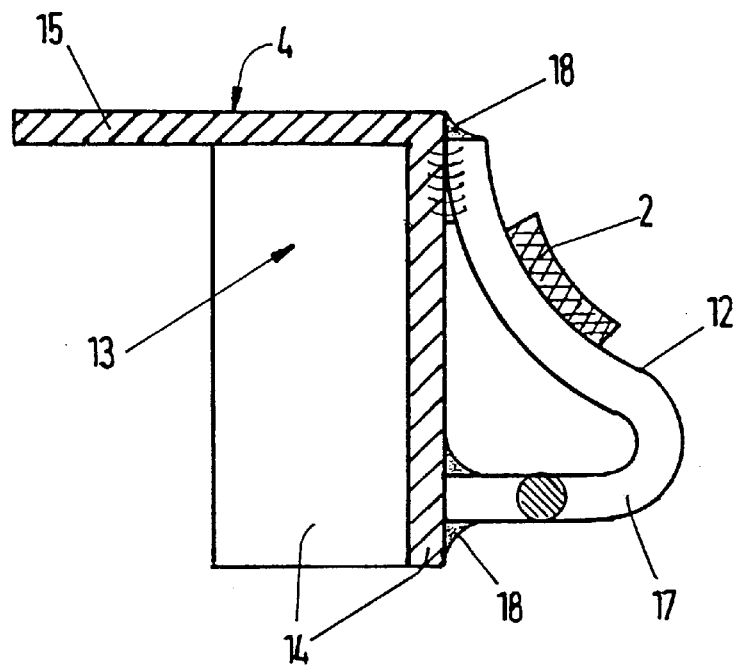
FIG. 8 The sectional view from the side of another embodiment of the combined deflection and support element as well as FIG. 9 The sectional view from the side of another embodiment of the combined deflection and support element.

The embodiment shown in FIG. 8, on the other hand, shows a deflection and support element 4, consisting of an angle with a covering surface or plate that overlaps the angle sides 14. The belt bearing surface 12 here is formed by bending a wire profile 17. The bent wire profile 17 is connected form-fitting with the basic body for the deflection and support element, formed from the angular sides 14 and covering surface 15, by welding together the materials at welding seams 18. The deflection and support element 4 can be made of plastic by, for example, an injection-molded or cast process. Likewise, deflection and support element 4 can be made of metal either by, for example, an injection-molded or cast process.

We claim:

1. A load securing device for securing a load to a loading surface, comprising:

a deflection and support element having a bearing surface, said deflection and support element being positioned on the load; and a prestressable lashing device that rests against and is guided by said bearing surface, wherein said deflection and support element is comprised of two sides connected together along one respective edge to form an angle therebetween, and a third side forming a plane perpendicular to the first two sides and connecting said two sides, said two sides together forming an outwardly projecting angle edge having the bearing surface thereon, said bearing surface being concave and guiding said lashing device thereupon whereby said three sides form a recess corresponding to a portion of the load and said bearing surface guides said prestressable lashing device from the loading surface diagonally across a side surface of the load when said lashing device is pulled tight, so that said lashing device secures and retains the load on the loading surface.

2. The load securing device defined in claim 1, wherein said deflection and support element is comprised of metal or plastic.

* * * * *